(12) United States Patent
Tortosa et al.

(10) Patent No.: US 7,512,933 B1
(45) Date of Patent: Mar. 31, 2009

(54) METHOD AND SYSTEM FOR ASSOCIATING LOGS AND TRACES TO TEST CASES

(75) Inventors: Andrea Tortosa, Rome (IT); Vinicio Bombacino, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/020,555

(22) Filed: Jan. 27, 2008

(51) Int. Cl.
  *G06F 9/44* (2006.01)
(52) U.S. Cl. ........................ 717/124; 717/101
(58) Field of Classification Search ............... None
  See application file for complete search history.

(56) References Cited

U.S. PATENT DOCUMENTS

| | | | |
|---|---|---|---|
| 5,146,460 A | 9/1992 | Ackerman et al. | |
| 5,740,183 A | 4/1998 | Lowe | |
| 6,185,707 B1 | 2/2001 | Smith et al. | |
| 6,694,456 B1 | 2/2004 | Ludwig | |
| 2008/0120521 A1* | 5/2008 | Poisson et al. | 714/26 |
| 2008/0184206 A1* | 7/2008 | Vikutan | 717/127 |

FOREIGN PATENT DOCUMENTS

| WO | WO9915909 A1 | 4/1999 |
|---|---|---|
| WO | WO2007/056750 A2 | 5/2007 |

* cited by examiner

*Primary Examiner*—Michael J Yigdall
(74) *Attorney, Agent, or Firm*—Maxvalueip, LLC (57) ABSTRACT

One of the examples is to define and use the concept of "Logs/Traces Profile" and "System Logs/Traces Profile" (including a role and the log and trace file locations), and incorporate them within the test design document. Each test design document can be associated to each test case to highlight which logs and traces need to be collected during its execution. In this way, the testers will know which logs and traces to provide to the code developers, when addressing an issue. In this way, developer can investigate the bug, understand them, and be able to fix the problem, especially due to timing, synchronization, and concurrency.

1 Claim, 7 Drawing Sheets

FIG 1

Logs/Traces Profile 1

Logs/Traces Profile 2

Logs/Traces Profile 3

METHOD AND SYSTEM FOR ASSOCIATING LOGS AND TRACES TO TEST CASES

BACKGROUND OF THE INVENTION

During the regular life cycle of code development and testing, the testers execute based on provided test cases (detailed step-by-step instruction of how and what to test). The main course of executing test cases is to check for the existence of defects or errors in a program, project, or product, based on some predefined instructions or conditions.

One of the embodiments of this invention is generally directed to the need to group all related logs and traces, and provide them to the developers, in order for them to investigate, understand, and fix the problem.

When issues and problems occur during the testing, the testers communicate those issues to the developers. In large teams and/or for the purpose of tracking such issues, the information is recorded and tracked through a bug tracking system accessible to the developers. Testers often do not know which logs and traces need to be grouped and provided to the developers, in order for them to investigate, understand, and fix the problem.

In addition to the regular testing observations, the developers may need to have access to the logs and traces (i.e. detailed application and system generated information) generated during the test case execution on the test environment/machines.

Most of the defects cannot be understood simply by describing the steps performed by the tester, during testing phase due to timing, synchronization, concurrency, and others issues. There is also a possibility that the problem may not be reproduced on the next try either, by the developer during code fix, or by the tester during execution of the test cases. Consequently, the testers often need to repeat the test cases in order to provide the correct documentation and data to the developers.

SUMMARY OF THE INVENTION

An embodiment of the invention is to provide a tool that defines and uses the concept of "Logs/Traces Profile" and "System Logs/Traces Profile" (comprising of a role and the log and trace file locations), incorporates them within the test design document, and associates the Role(s) to individual test cases, within the document.

These "Logs/Traces Profile" is an object that includes, for example, a list of log and trace files and a role associated with a machine in the test environment. "System Logs/Traces Profile" is a set of "Logs/Traces Profile" objects identifying each "Logs/Traces Profile" object.

Once defined in the test design document, they can be associated to each test case to highlight which logs and traces need to be collected (when executing the test case), before opening a defect. In this way, testers will know which logs and traces to provide, when addressing an issue, even before executing a test case.

In this way, the tester can group all related logs and traces, and provide to the code developers. Having these Logs/Traces profile available, developer can investigate the issue/bug, understand them precisely and able to fix the problem, especially due to timing, synchronization, concurrency, and any other way.

DETAILED DESCRIPTION OF THE PREFERRED EMBODIMENTS

The Test Case Repository holds all the test cases in order to test the application. In general, each directory in the repository is devoted to a single issue. If a directory is empty, then no test scenarios have been created for the issue. In particular, test scenario (or often called test case) is a set of conditions under which a tester determines if a requirement or use case upon an application is partially or fully satisfied. It may take many test cases with several round of testing to determine that a requirement of the application is fully satisfied.

Test case is a documentation comprising pre-condition, input data, and post-condition with predicted results. It clearly describes the step-by-step process to test any piece of code.

Every test case depends on timing, synchronization, concurrency and others issues. Most IT managers agree that concurrency testing is the appropriate way to determine many performance bottlenecks, resource contention issues, and service interruptions. However, few ever do concurrency testing because the available test tools are not satisfactory.

There is no set concurrency testing in software testing life-cycle. You can never create a deterministic test to uncover a non-deterministic concurrency issue. The goal, instead, is to get close to the problem and to get lucky. Operating a concurrency test with as many of the above operational parameters might not guarantee that the test will surface concurrency issues, but it will work the odds in your favor to run across the right conditions to trigger a failure.

If synchronization is to take place automatically the system will determine when it shall take place. This will be at points in the testing process such as:
  When a group of tests starts
  When a single test starts
  At the end of each test
  At the end of each group of tests So, most of the defects cannot be understood simply by describing the steps performed by the tester during testing phase due to timing, synchronization, concurrency and others issues. There is also a possibility that the problem may not be reproduced on the next try either by the developer during code fix or by the tester during execution of the test cases.

An example of the present invention is to provide a tool that defines the Logs/Traces Profile objects (comprising of Role and the log and trace file locations), incorporates them within the test design document, and associates the Role(s) to individual test cases within the document.

There will be a set of predefined profiles comprising of different roles with log/trace detail, under which the computing device or system will be tested. Number and type of profiles will depend on the application to be tested.

System uses the templates associated with specific products, which are used in the test environment, to test the application. These templates have information about where the logs and traces files are generated and/or collected during execution of the test cases related to the product. These templates will need to be customized to specifically identify the machine were these logs/traces are located.

Figure 1:
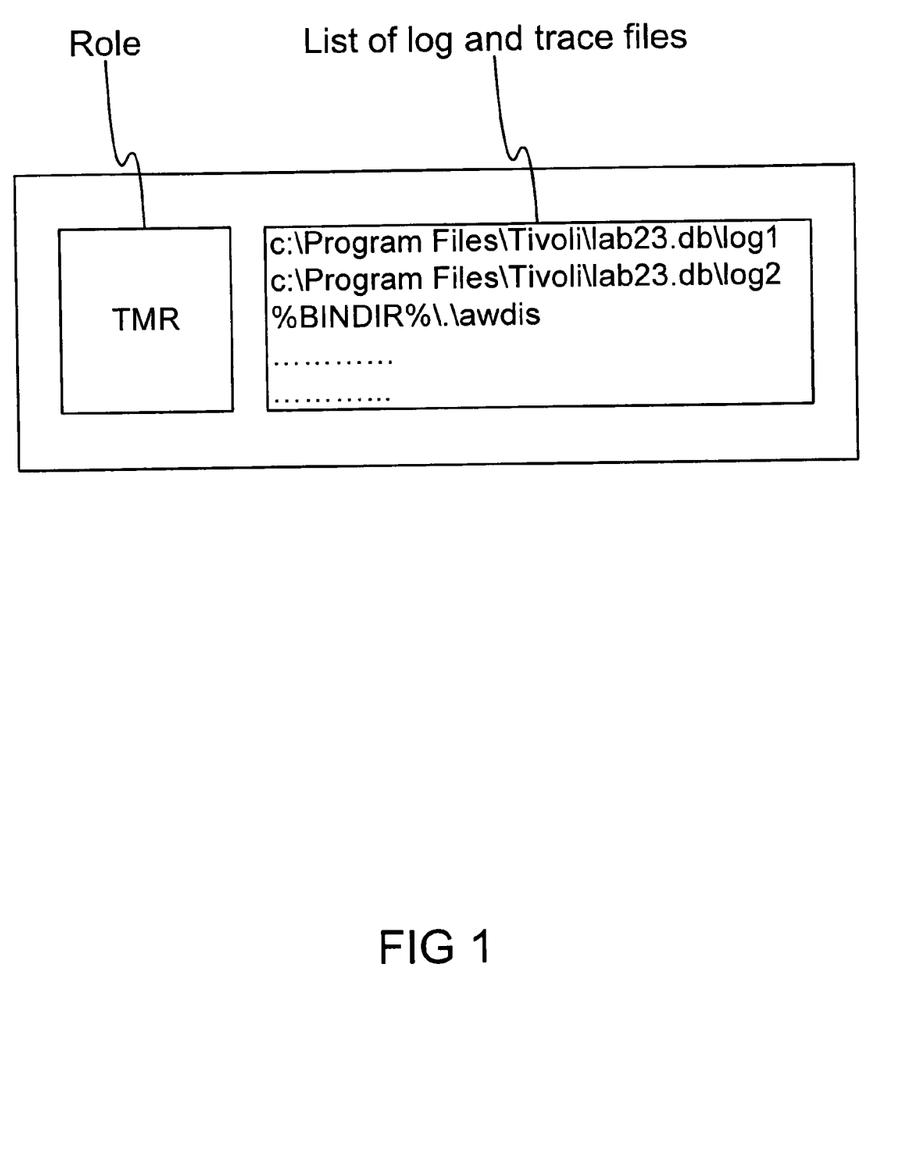
FIG. 1 is an example of "Logs/Traces Profile".

In FIG. 1, TMR (Tivoli (Reg. Trademark) Management Region) represents a role and the profile includes the list of files that must be collected when this "Logs/Traces Profile" is associated to a test case. This means that before opening a defect for that test case, the specified files must be collected on the TMR server and provided to development team. Having these Logs/Traces profile, developer can investigate the issue/bug, understand them precisely, and be able to fix the problem. (FIG. 1)

Figure 2:
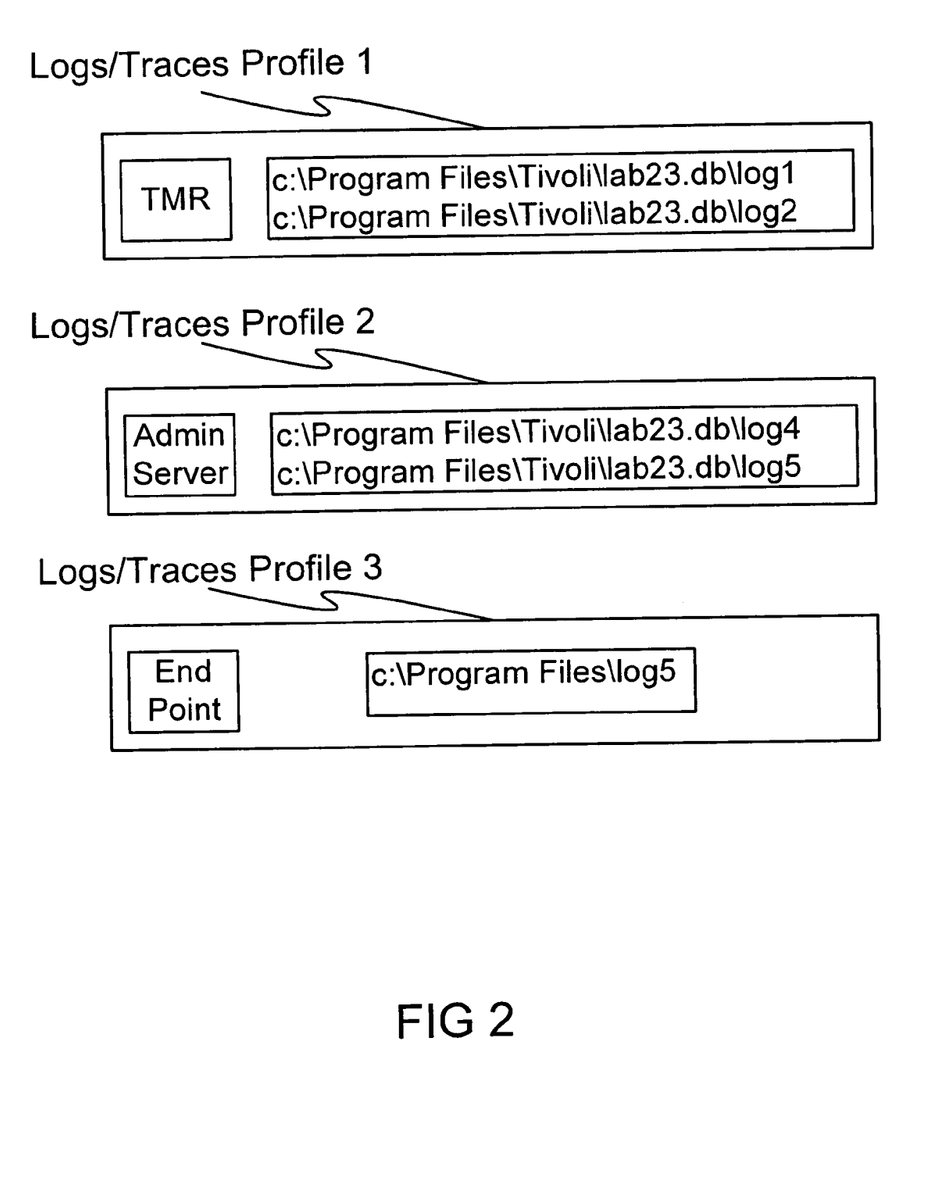
FIG. 2 is an example of "System Logs/Traces Profile".

FIG. 2 shows an example of "System Logs/Traces Profile". It applies to the TMR, Admin server, and endpoint roles. They include the list of files that must be collected on each machine covering the related role when these "Logs/Traces Profile" is associated to a test case. This means that before opening a defect for that test case, the specified files must be collected on the TMR, Admin server and Endpoint and provided to development team. (FIG. 2)

Therefore, the test design should include a definition of all the relevant "Logs/Traces Profile" and "System Logs/Traces Profile", and each test case should be associated to the related "Logs/Traces Profile" or "System Logs/Traces Profile" to keep the tester informed of the identity and location of the files needed to be provided to the development team before opening a defect related to the test case.

System has predefined templates related to specific products (e.g. Tivoli (Reg. Trademark)) that should be customized with the name of the machines where the files need to be collected. Test case machine associated with the roles can be accessed remotely by the developer team to collect the files, based on the specified "Logs/Traces Profile" or "System Logs/Traces Profile". Test case machine provide the files all together at a location accessible to the development team.

Figure 3:
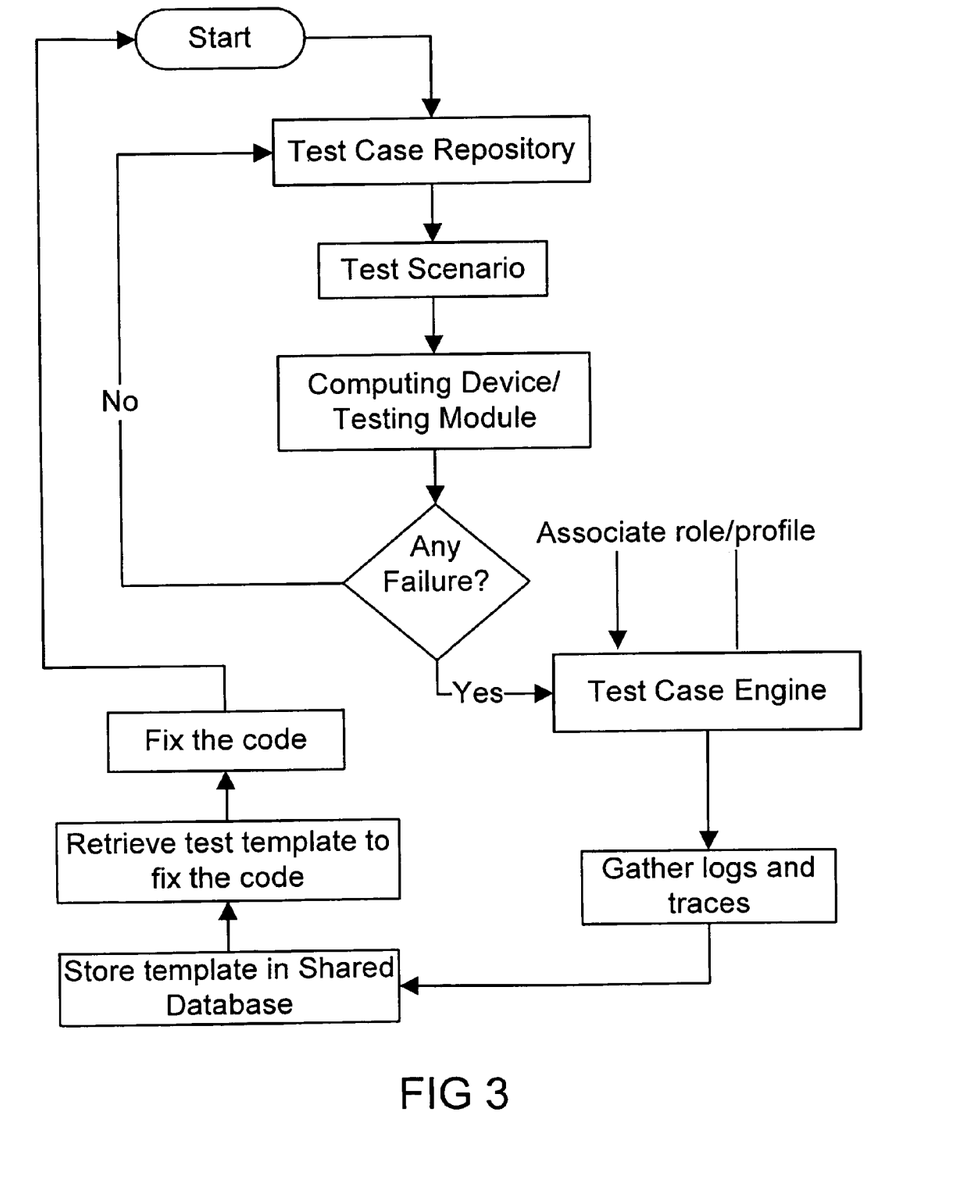
FIG. 3 is a block diagram of a typical system test cycle. It includes test case repository, test scenario, test case engine and template.

A testing design document will be provided to each tester to test the system. The test design document (FIG. 3) includes test case and test definitions. Test case, which is based on the template, associated to a corresponding application, defines the path to corresponding log and trace. Test definition document stores the definition of "Logs/Traces Profile" and "System Logs/Traces Profile". (FIG. 3)

Figure 4:
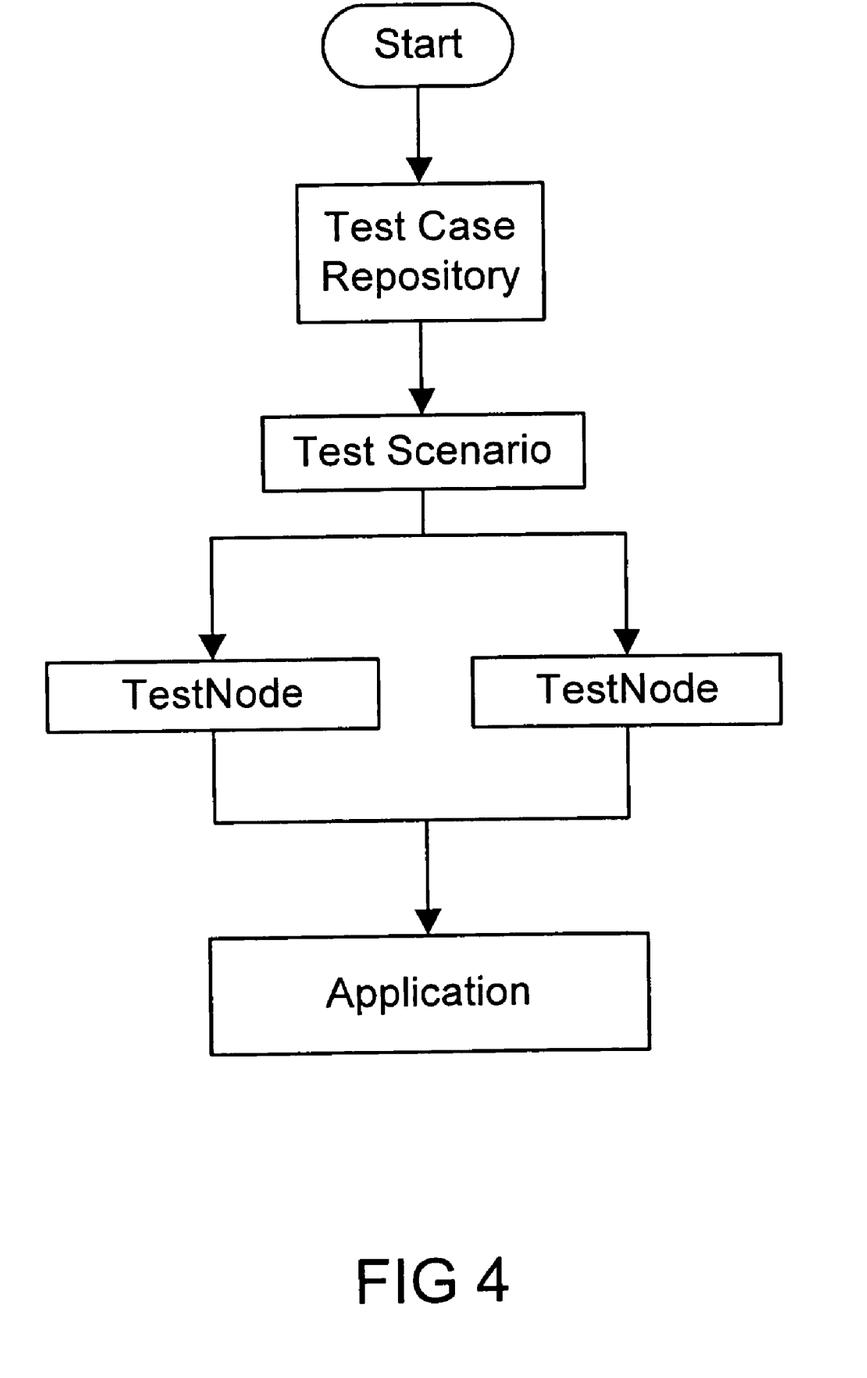
FIG. 4 is a representation of the concurrency test, where test case is performed between two test nodes at the same time to perform the concurrency test.

Each test case for specified role is tested by the tester. It indicates a failure or a success based on predefined post conditions of the test case. In case of test case failure, log and trace are generated during the execution of test case, on a test environment or a test device. (FIG. 4)

System locates and pulls those files when there is an issue during the test case execution from the test environment to a location accessible to the developers (e.g. bug tracking system or a shared space). In case of a failure, it clearly indicates which of (one or more) corresponding devices contributing to test case failure.

System automatically gathers corresponding log and trace, with the corresponding profile and role, and stores in a database repository. These details of log and traces, with corresponding profile and role, will be available to code developer to trace the exact cause of failure, understand and fix them. These details, with role and profile, including traces and logs, are very useful and necessary for a developer to avoid issues related to lack of synchronization, timing, concurrency, and reproducibility.

Figure 5:
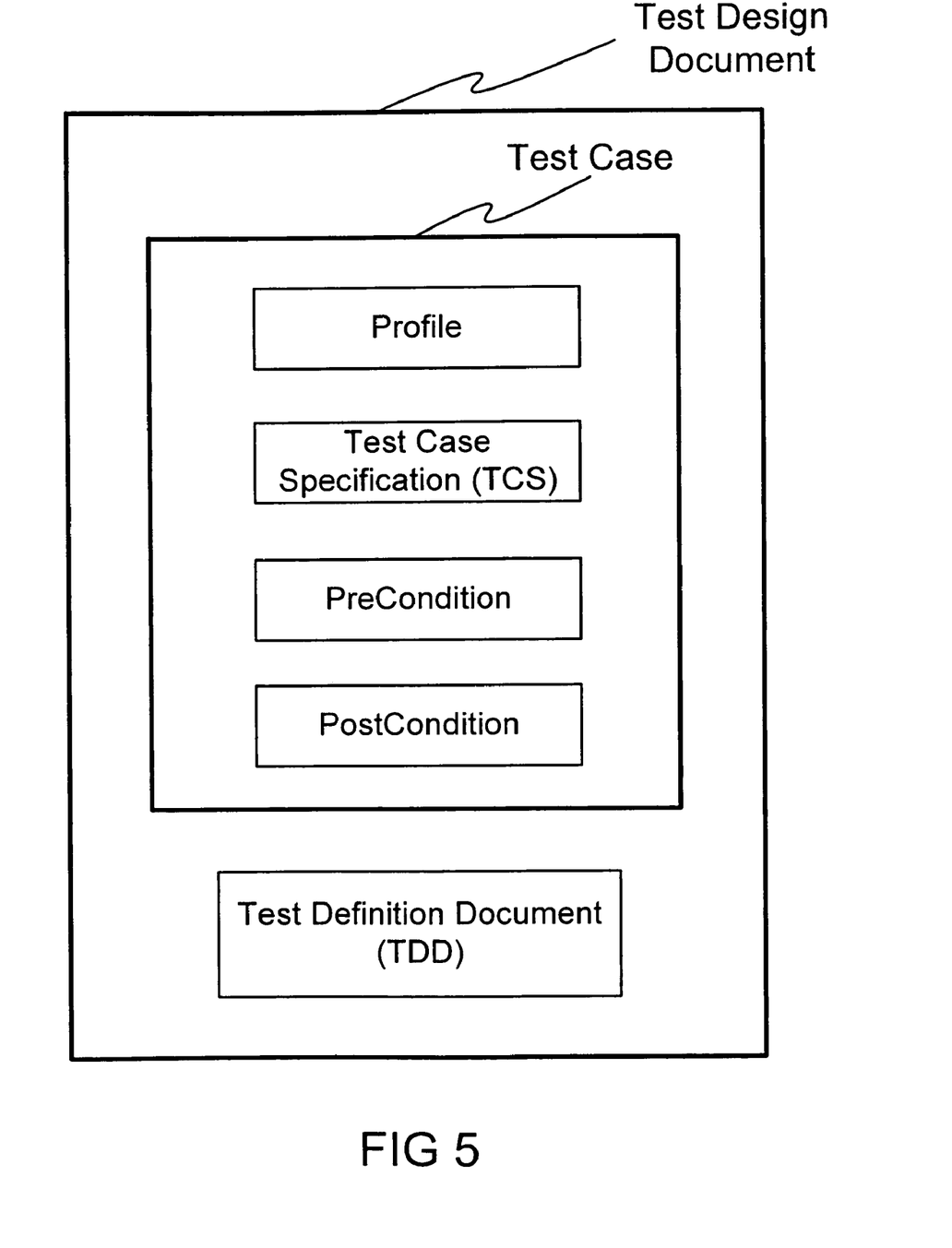
FIG. 5 is a representation of the test design document. It consists of a test case and test definition document (TDD).
Figure 6:
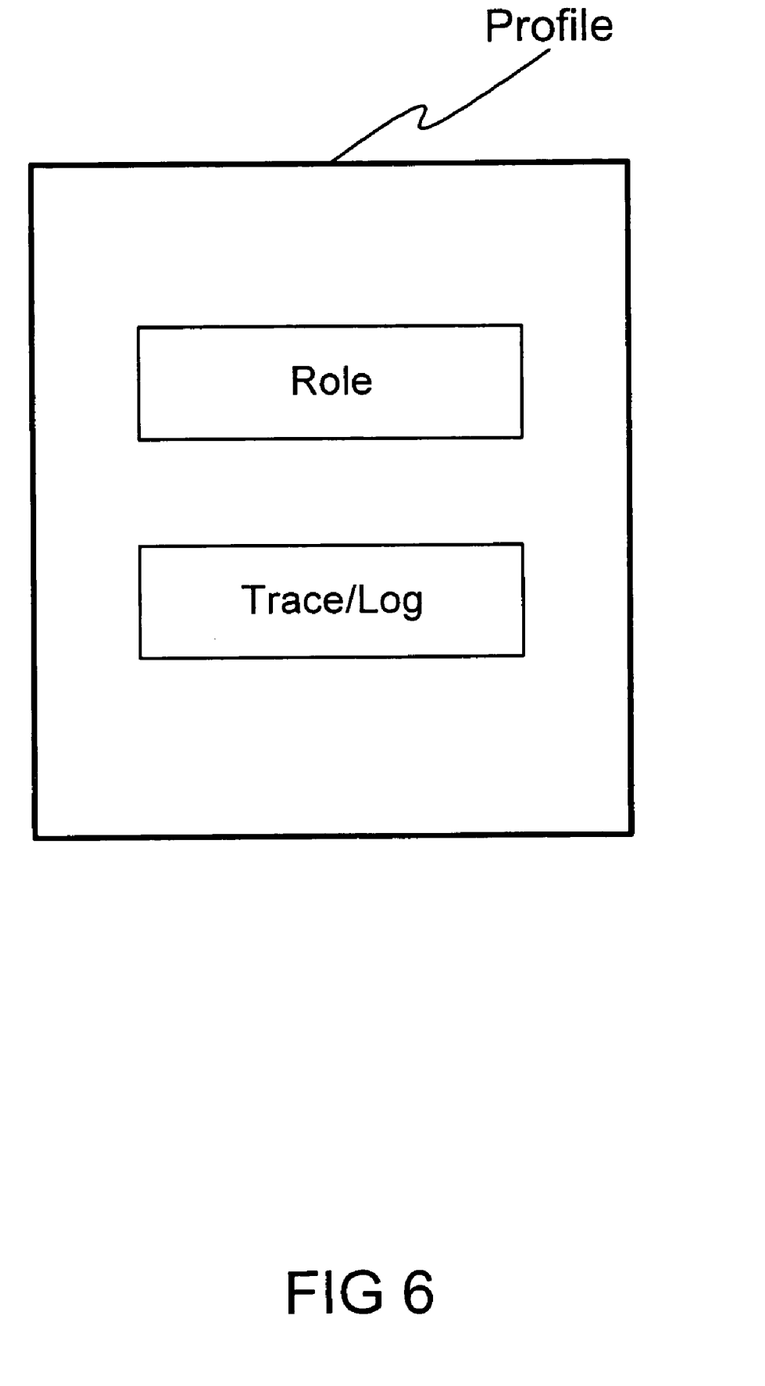
FIG. 6 is a representation of the test profile which consists of a role and log/trace.
Figure 7:
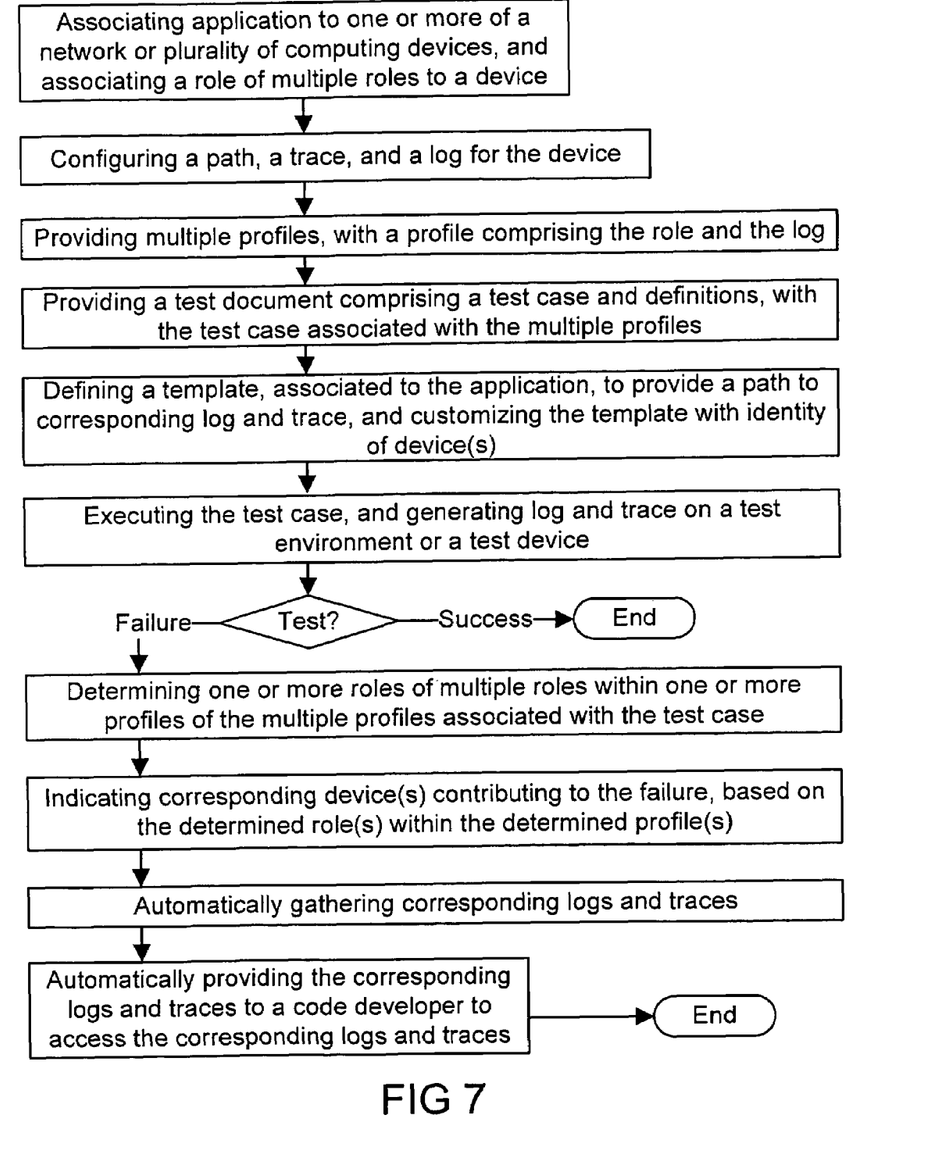
FIG. 7 represents the method of claim 1.

In one example, we have a method for associating logs and traces to test cases during a life-cycle of code development and testing, for a network or plurality of computing devices. The method comprises the following steps, as an example:

associating a first application to one or more of the network or plurality of computing devices;

associating a first role to a first one of the network or plurality of computing devices;

for the first one of said network or plurality of computing devices, configuring a path, a trace, and a log; (FIG. 6)

providing a profile;

wherein the profile comprising the first role and the log;

providing a test design document, wherein the test design document comprises a first test case and definitions, wherein the first test case describes how to test and what to test, (FIG. 5) wherein the first test case comprises post-condition and pre-condition, (FIG. 5) wherein the log and the trace are generated during the execution of the first test case, on a test environment or a test device, to track problems, issues, and bugs, and wherein the first test case indicates a failure or a success.

If a specific test case indicates a failure, then the system indicates which role within which profile is associated with said specific test case, defines a template, associated to a corresponding application, to provide a path to corresponding log and trace, customizes the template to identify one or more of corresponding devices among the network or plurality of computing devices, where the corresponding log and trace are located, indicates which of the one or more of corresponding devices contributing to said failure, automatically gathers the corresponding log and trace, with the corresponding profile and role, in a database repository, and automatically provides the corresponding log and trace, with the corresponding profile and role, to a code developer, to track the exact cause of said failure, and to avoid issues related to the lack of synchronization, timing, concurrency, and reproducibility.

A system, apparatus, or device comprising one of the following items is an example of the invention: logs, traces, testing equipment, storage for logs and traces, server, computer, system software, microprocessor, processor, event handlers, testing system or module, client device, PDA, mobile device, cell phone, router, switches, network, communication media, cables, fiber optics, physical layer, buffer, nodes, packet switches, timer, synchronizer, computer monitor, or any display device, applying the method mentioned above, for purpose of logging, tracing, testing, and error/system management.

Any variations of the above teaching are also intended to be covered by this patent application.

The invention claimed is:

1. A method for associating logs and traces to test cases during a life-cycle of code development and testing, for a network or plurality of computing devices, said method comprising the steps of:

associating a first application to one or more of said network or plurality of computing devices;

associating a first role of multiple roles to a first one of said network or plurality of computing devices;

for said first one of said network or plurality of computing devices, configuring a path, a trace, and a log;

providing multiple profiles;

wherein a first profile of said multiple profiles comprises said first role and said log;

providing a test design document;

wherein said test design document comprises a first test case and definitions;

wherein said test case is associated with said multiple profiles;

said first test case describing how to test and what to test;

wherein said first test case comprising post-condition and pre-condition;

defining a template, associated to said first application, to provide a path to corresponding log and trace;

customizing said template with identity of one or more of corresponding devices among said network or plurality of computing devices where said corresponding log and trace are located;

executing said first test case, and generating said log and said trace on a test environment or a test device, to track problems, issues, and bugs;

said first test case indicating a failure or a success; and if said first test case indicates a failure, then
   determining which one or more roles of said multiple roles within which one or more profiles of said multiple profiles is associated with said first test case, based on said test design document;

indicating which of said one or more of corresponding devices contributing to said failure, based on said determined one or more roles within said determined one or more profiles;

automatically gathering corresponding logs and traces, associated with said determined one or more roles within said determined one or more profiles, in a database repository; and automatically providing said corresponding logs and traces to a code developer, and said code developer accessing said corresponding logs and traces to track the exact cause of said failure, and to avoid issues related to the lack of synchronization, timing, concurrency, and reproducibility.

* * * * *